United States Patent
Ke et al.

(10) Patent No.: US 10,499,327 B2
(45) Date of Patent: Dec. 3, 2019

(54) NETWORK SELECTION METHOD AND BASE STATION

(71) Applicant: Samsung Electronics Co., Ltd., Gyeonggi-do (KR)

(72) Inventors: Xiaowan Ke, Beijing (CN); Lixiang Xu, Beijing (CN); Hong Wang, Beijing (CN)

(73) Assignee: Samsung Electronics Co., Ltd (KR)

( * ) Notice: Subject to any disclaimer, the term of this patent is extended or adjusted under 35 U.S.C. 154(b) by 46 days.

(21) Appl. No.: 15/741,339

(22) PCT Filed: Jul. 1, 2016

(86) PCT No.: PCT/KR2016/007119
§ 371 (c)(1),
(2) Date: Jan. 2, 2018

(87) PCT Pub. No.: WO2017/003255
PCT Pub. Date: Jan. 5, 2017

(65) Prior Publication Data
US 2018/0199277 A1     Jul. 12, 2018

(30) Foreign Application Priority Data

Jul. 2, 2015  (CN) .......................... 2015 1 0382369
Nov. 6, 2015  (CN) .......................... 2015 1 0752588

(51) Int. Cl.
*H04W 48/18*    (2009.01)
*H04W 76/10*    (2018.01)
(Continued)

(52) U.S. Cl.
CPC ........... *H04W 48/18* (2013.01); *H04W 76/10* (2018.02); *H04W 76/12* (2018.02); *H04W 76/27* (2018.02)

(58) Field of Classification Search
CPC ..... H04W 76/12; H04W 76/27; H04W 76/10; H04W 48/18
See application file for complete search history.

(56) References Cited

U.S. PATENT DOCUMENTS

2011/0205900 A1*  8/2011  Zhang ............... H04L 12/437
                                                  370/237
2012/0113809 A1   5/2012  Cortes Gomez
(Continued)

FOREIGN PATENT DOCUMENTS

WO   WO 2015034227    3/2015

OTHER PUBLICATIONS

PCT/ISA/210 Search Report issued on PCT/KR2016/007119 (pp. 3).

(Continued)

*Primary Examiner* — Brian D Nguyen
(74) *Attorney, Agent, or Firm* — The Farrell Law Firm, P.C.

(57) ABSTRACT

The present invention provides a network selection method, comprising: acquiring, by a first base station, core network type information of a core network node from UE, a second base station or a first core network node; and selecting, by the first station, a core network node for the UE according to the acquired core network type information and information about a second core network node provided by the UE. The present further provides a base station device. The application of the present application may reduce the re-routing between core network nodes, shorten the access delay of UE, and satisfy the communication demand of UE types or service types that have requirements on delay.

18 Claims, 4 Drawing Sheets

(51) Int. Cl.
*H04W 76/27* (2018.01)
*H04W 76/12* (2018.01)

(56) References Cited

U.S. PATENT DOCUMENTS

| | | | |
|---|---|---|---|
| 2015/0156691 A1 | 6/2015 | Hayashi | |
| 2015/0312822 A1* | 10/2015 | Bangolae | H04W 36/08 370/311 |
| 2015/0327133 A1* | 11/2015 | Yiu | H04W 48/20 455/436 |
| 2016/0007346 A1* | 1/2016 | Sirotkin | H04L 5/0085 370/329 |
| 2016/0014642 A1* | 1/2016 | Liang | H04W 36/0022 370/331 |
| 2016/0174120 A1* | 6/2016 | Zembutsu | H04W 36/0005 370/331 |
| 2016/0219605 A1* | 7/2016 | Karlsson | H04W 72/06 |
| 2016/0227597 A1 | 8/2016 | Cho et al. | |
| 2016/0277956 A1* | 9/2016 | Lindheimer | H04W 36/22 |
| 2016/0309379 A1* | 10/2016 | Pelletier | H04W 76/27 |
| 2017/0188280 A1* | 6/2017 | Watfa | H04W 36/0055 |
| 2017/0195926 A1* | 7/2017 | Iwai | H04W 24/04 |
| 2017/0251357 A1* | 8/2017 | Iwai | H04W 8/08 |
| 2017/0311371 A1* | 10/2017 | Olsson | H04W 76/27 |

OTHER PUBLICATIONS

PCT/ISA/237 Written Opinion issued on PCT/KR2016/007119 (pp. 7).
3GPP SA WG2 Meeting #103, S2-141710, May 19-23, 2014, Phoenix, Arizona, USA, NTT DOCOMO, P-CR on Solution 1: Redirection Solution, pp. 7.
3GPP SA WG2 Meeting #104, S2-142879, Jul. 7-11, 2014, Dublin, Ireland, NTT DOCOMO, P-CR on Solution 1: Redirection after update location procedure, pp. 9.

* cited by examiner

[Fig. 1]
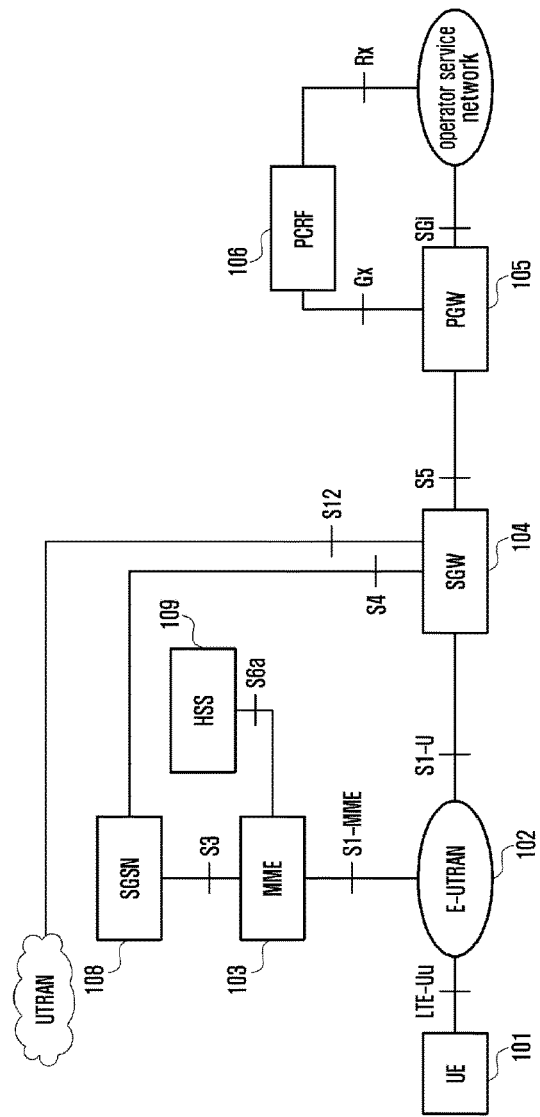
[Fig. 2]
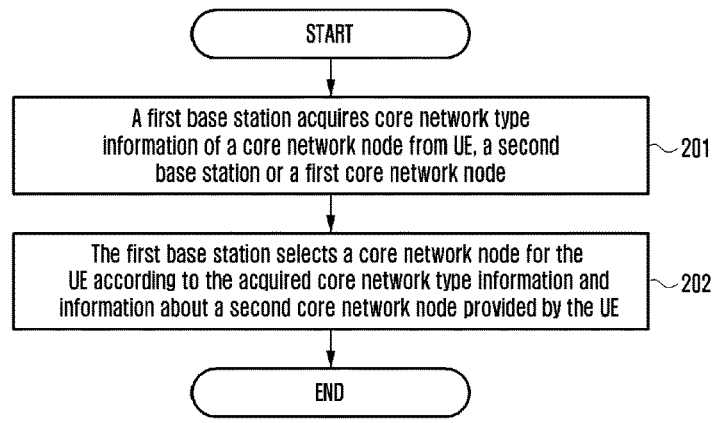

[Fig. 3]
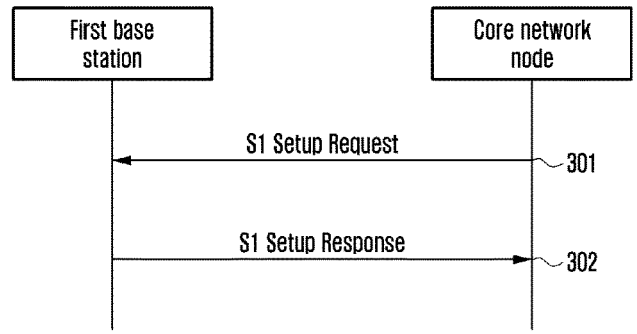
[Fig. 4]
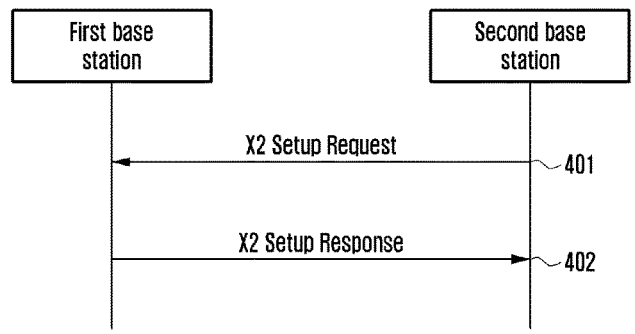
[Fig. 5]
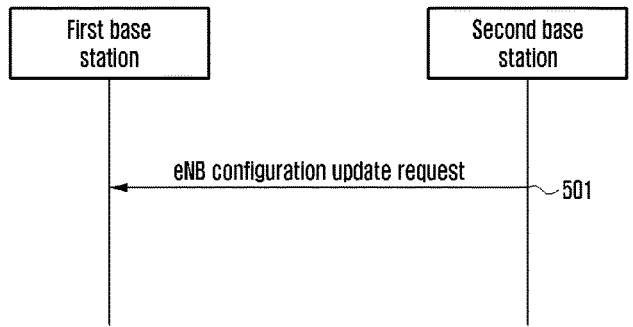
[Fig. 6]
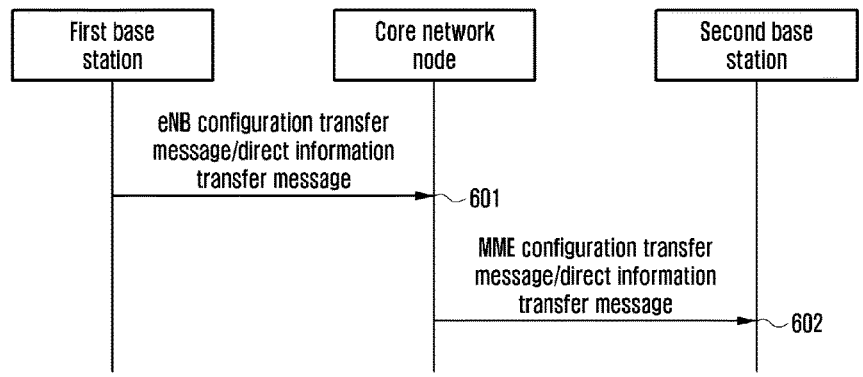

[Fig. 7]
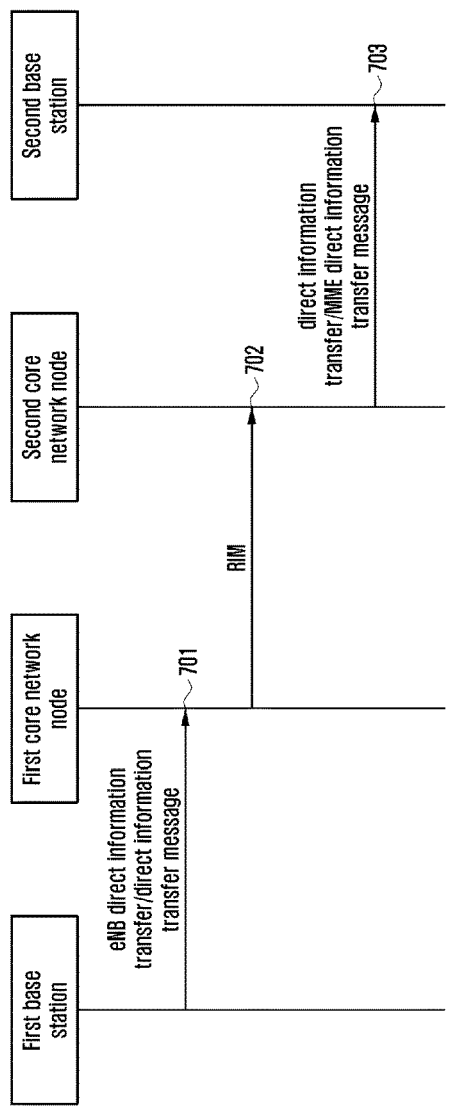
[Fig. 8]
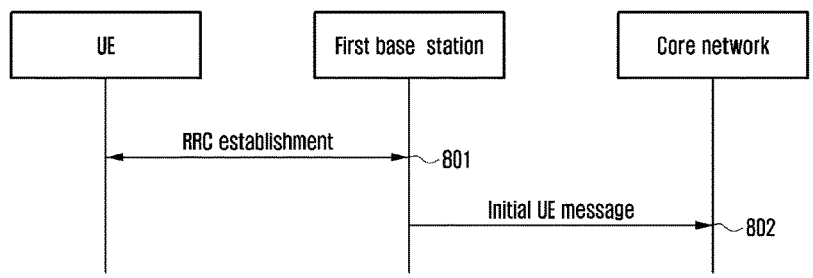
[Fig. 9]

[Fig. 10]
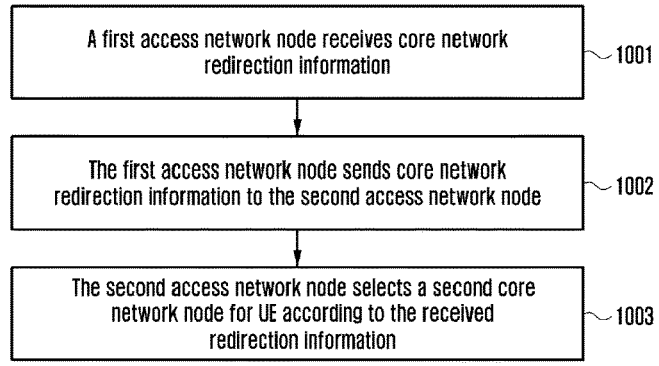
[Fig. 11]
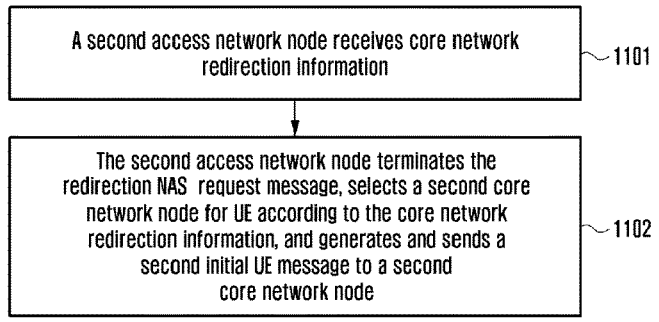
[Fig. 12]
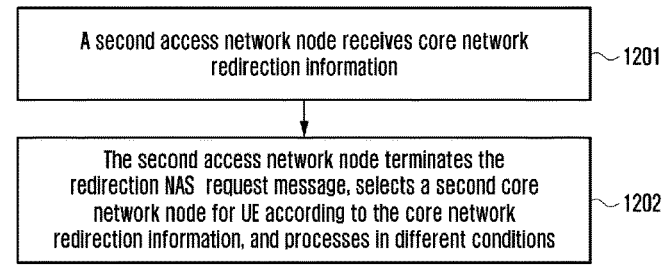
[Fig. 13]
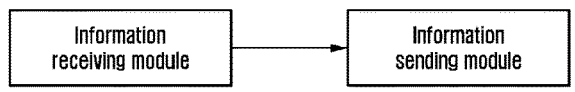
[Fig. 14]
[Fig. 15]
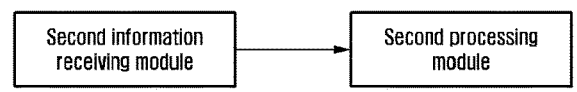

NETWORK SELECTION METHOD AND BASE STATION

PRIORITY

This application is a National Phase Entry of PCT International Application No. PCT/KR2016/007119 which was filed on Jul. 1, 2016, and claims priority to Chinese Patent Application Nos. 201510382369.8 and 201510752588.0, which were filed on Jul. 2, 2015 and Nov. 6, 2015, respectively, the content of each of which is incorporated herein by reference.

TECHNICAL FIELD

The present invention relates to the wireless communication technology and in particular to a network selection method and a base station.

BACKGROUND

The modern mobile communications increasingly provide multi-media services of high-rate transmission to users. FIG. 1 is a system architecture diagram of System Architecture Evolution (SAE), in which:

User equipment (UE) 101 is a terminal device supporting network protocol; Evolved-Universal Terrestrial Ratio Access Network (E-UTRAN) 102 is a wireless access network, wherein including a base station (eNodeB/NodeB) which provides an interface for UE for accessing to a wireless network. Mobility Management Entity (MME) 103 is responsible for managing the mobility context, session context and security information of UE. Serving Gateway (SGW) 104 mainly plays a role of providing a user plane, and the MME 103 and the SGW 104 may be placed in a same physical entity; Packet Data Gateway (PGW) 105 is responsible for charging, lawful interception or more, and may be placed in the same physical entity as the SGW 104. Policy and Charging Rule Functional Entity (PCRF) 106 provides a Quality of Service (QoS) policy and charging rule. Serving GPRS Support Node (SGSN) 108 is a network node device which provides routing for transmission of data in a Universal Mobile Communication System (UMTS). Home Subscriber Server (HSS) 109 is a home registration subsystem of UE, and responsible for protecting user information such as current location of UE, address of a serving node, user security information, packet data context of UE.

In the existing networks, deploying a dedicated core network for specific types of UE will cause the increase in access delay of UE, which is disadvantageous for UE types or service types which have requirements on access delay.

DISCLOSURE OF INVENTION

Solution to Problem

An objective of the present invention is to provide a network method and a base station to reduce re-routing between core network nodes and UE access delay.

The present application provides a network selection method, including:

acquiring, by a first base station, core network type information of a core network node from user equipment (UE), a second base station or a first core network node; and selecting, by the first base station, a core network node for the UE, according to the acquired core network type information and information about a second core network node provided by the UE.

Preferably, the first base station obtains, according to the core network type information of said core network node, information about whether a core network to which said core network node belongs is a dedicated core network and/or information about a dedicated core network to which said core network node belongs.

Preferably, the core network type information of said core network node at least contains one of the following contents: an indicator of a dedicated core network, an identifier of a dedicated core network, a supported UE type, a supported user type, a supported service type, a dedicated core network type, an identifier of the core network node, a group identifier of the core network node, and an identifier of a Public Land Mobile Network (PLMN).

Preferably, said core network node is an MME or a Serving GPRS Support Node (SGSN), and an identifier of said core network node includes but is not limited to a Globally unique Mobility Management Entity Identifier (GUMMEI), a Mobility Management Entity Code (MMEC), and an SGSN identifier.

Preferably, said core network node is an MME or an SGSN, and a group identifier of said core network node includes but is not limited to an MME Group Identifier (MMEGI) and an SGSN pool identifier.

Preferably, the core network type information of a core network node, acquired from the UE, is core network type information of a last core network node attached by the UE.

Preferably, the core network type information of a core network node, acquired from the second base station, is core network type information of a core network node to which the second base station and/or a neighboring base station is connected.

Preferably, the core network type information of a core network node, acquired from the first core network node, is core network type information of the first core network node.

Preferably, said second core network node is a last core network node attached by the UE; and said first base station selecting the core network node for the UE according to the acquired core network type information and information about the second core network node provided by the UE includes: selecting, by a first station, a core network node having a same core network type information as a last core network node attached by the UE, according to core network type information of the last core network node attached by the UE and core network type information of a core network node to which the first base station is connected.

Preferably, in the following conditions, the first base station selects, for the UE, a core network node in a non-dedicated core network or default dedicated core network or randomly selects a core network node:

condition 1: the second core network node does not belong to any dedicated core network;

condition 2: the core network type information of the core network node to which the first base station is connected, is different from the core network type information of the second core network node;

condition 3: the core network type information acquired by the first base station does not contain the core network type information of the second core network node; and condition 4: PLMN selected by the UE is different from PLMN on which the UE is registered finally.

The present application further provides a base station, including information acquisition module and a network selection module, wherein:

said information acquisition module is configured to acquire core network type information of a core network node from UE, a second base station or a first core network node; and said network selection module is configured to select a core network node for the UE, according to the acquired core network type information and information about a second core network node provided by the UE.

The present application further provides a network selection method, including:

receiving, by a first access network node, core network redirection information; and sending, by the first access network node, the core network redirection information to a second access network node, the core network redirection information being used by the second access network node to select a second core network node for UE.

Preferably, said core network redirection information at least contains one of the following contents: a core network node group identifier, information about a core network node to which the UE has accessed, a Non-Access Stratum Protocol Data Unit (NAS PDU), all contents in a first initial UE message, and at least one information element (IE) contained in the first initial UE message.

Preferably, said information about a core network node to which the UE has accessed at last contains one of the following contents: an identifier of a core network node to which the UE has accessed, and a temporary identifier allocated to the UE by a core network node to which the UE has accessed.

Preferably, the core network redirection information received by the first access network node is received from the second access network node or a first core network node.

Preferably, the first access network node sends core network redirection information to the second access network node by containing the core network redirection information in a second initial UE message.

Preferably, a mode for the first access network node to contain the core network redirection information in the second initial UE message includes at least one of the following modes:

the first access network node contains received identifier of a core network node to which the UE has accessed in a newly added information element of the second initial UE message, or the first access network node replaces a core network node identifier in the second initial UE message with received identifier of a core network node to which the UE has accessed;

the first access network node contains, received temporary identifier allocated to the UE by a core network node to which the UE has accessed, in the second initial UE message;

the first access network node contains, a core network node identifier in received temporary identifier allocated to the UE by a core network node to which the UE has accessed, in a newly added information element of the second initial UE message, or the first access network node replaces a core network node identifier in the second initial UE message with received temporary identifier allocated to the UE by a core network node to which the UE has accessed; and the first access network node sets GUMMEI type as native or newly adds a type, the newly added type indicating that a core network node identifier in the second initial UE message is a core network node identifier in the core network redirection information.

The present invention further provides a network selection device, including an information receiving module and an information sending module, wherein:

said information receiving module is configured to receive core network redirection information; and said information sending module is configured to send the core network redirection information to a second access network node, said core network redirection information is used by the second access network node to select a second core network node for UE.

The present invention further provides a network selection method, including:

by a second access network node, receiving core network redirection information; and by the second access network node, terminating a redirection NAS request message, selecting a second core network node for UE according to the core network redirection information, and generating and sending a second initial UE message to a second core network node.

The present invention further provides a network selection device, including a first information receiving module and a first processing module, wherein:

said first information receiving module is configured to receive core network redirection information; and said first processing module is configured to terminate a redirection NAS request message, select a second core network node for UE according to the core network redirection information, and generate and send a second initial UE message to the second core network node.

The present invention further provides a network selection method, including:

by a second access network node, receiving core network redirection information; and by the second access network node, terminating a redirection NAS request message, selecting a second core network node for UE according to the core network redirection information, and processing in one of the following two conditions:

condition 1: the second access network node generates and resends a second initial UE message to a first core network node if the second core network node is not adaptable for access of the UE, said second initial UE message containing an identifier allocated to the UE by the first core network node and used by a first core network to index context of the UE; and condition 2: the second access network node requests the first core network node to release the context of the UE.

The present invention further provides a network selection device, including a second information receiving module and a second processing module, wherein:

said second information receiving module is configured to receive core network redirection information; and said second processing module is configured to terminate a redirection NAS request message, select a second core network node for UE according to the core network redirection information, and process in one of the following two conditions:

condition 1: the second access network node generates and resends a second initial UE message to a first core network node if the second core network node is not adaptable for access of the UE, said second initial UE message containing an identifier allocated to the UE by the first core network node and used by a first core network to index context of the UE; and condition 2: the second access network node requests the first core network node to release the context of the UE.

It may be seen from the above technical solutions that, a base station may determine. core network type information of a core network node on which UE is registered finally, by acquiring the core network type information of the core network node, and thus select accurately a proper new core network node for the UE, so that the re-routing between core network nodes is reduced, the access delay of UE is shortened, and the communication demand of UE types or service types that have requirements on delay is satisfied.

BRIEF DESCRIPTION OF DRAWINGS

FIG. 1 is a system architecture diagram of existing SAE;

FIG. 2 is a schematic flowchart of a network selection method according to the present invention;

FIG. 3 is a schematic view of a first embodiment of the network selection method according to the present invention;

FIG. 4 is a schematic view of a second embodiment of the network selection method according to the present invention;

FIG. 5 is a schematic view of a third embodiment of the network selection method according to the present invention;

FIG. 6 is a schematic view of a fourth embodiment of the network selection method according to the present invention;

FIG. 7 is a schematic view of a fifth embodiment of the network selection method according to the present invention;

FIG. 8 is a schematic view of a sixth embodiment of the network selection method according to the present invention;

FIG. 9 is a schematic composition structure diagram of a preferred base station according to the present invention;

FIG. 10 is a schematic flowchart of a second network selection method according to the present invention;

FIG. 11 is a schematic flowchart of a third network selection method according to the present invention;

FIG. 12 is a schematic flowchart of a fourth network selection method according to the present invention;

FIG. 13 is a schematic flowchart of a second network selection device according to the present invention;

FIG. 14 is a schematic flowchart of a third network selection device according to the present invention; and FIG. 15 is a schematic flowchart of a fourth network selection device according to the present invention.

MODE OF THE INVENTION

In the existing networks, the type of users and the demands of users on services are diverse. In order to satisfy demands of all users, a core network needs to support a variety of function sets. For some user groups with a huge number of users and low service demands, for example, IoT devices and users, deploying a network supporting all function sets, on one hand, is highly costly, and on the other hand, causes great resource waste. For operators, one concept is to deploy a specific dedicated core network including dedicated core network elements and resource configurations in order to satisfy the communication demand of a group of UE of a specific type. When UE in this group of a specific type accesses to the network, a core network node in a dedicated core network is selected to serve the UE.

When a user initiates connection establishment in idle mode, the base station selects a core network node for UE. However, since the base station does not know the type of the UE and also which core networks designed for serving UE of a specific type, after the base station selects a core network node (for example, MME, SGSN) for the UE, if the current core network is not designed for serving the UE type to which the UE belongs, the UE initiates a redirection request to the base station to request the base station to resend a serving request of the UE to a proper core network node.

The present existing technologies also have the following problems:

problem 1): the redirection process to a core network node may cause the increase in access delay of UE and influence the communication demand of UE which have requirements on access delay;

problem 2): the base station is unable to distinguish the types of UE and the service types of UE;

problem 3): the base station does not know whether the connected core network node belongs to a dedicated core network and which dedicated core networks it belongs to, and also does not know which UE type or service type a dedicated core network supports;

problem 4): when UE moves between base stations or between radio access technologies (RATs), a destination base station does not know whether a serving core network node in a source base station belongs to a dedicated core network and which core networks it belongs to, and also does not know which UE type or service type a dedicated core network supports;

problem 4): when UE accesses through a relay node or a home base station (HeNB/HNB), it is to be connected to a core network through a donor base station (Donor eNB) or a home base station gateway (HNB GW/HeNB GW); and in this case, when UE accesses, the function of redirecting to a dedicated core network is not clear; and Problem 5): when the base station redirects UE to a dedicated core network, the base station may redirect the UE back to a core network node to which the UE is accessed initially if all dedicated core network nodes are overloaded; and although the context of the UE may be saved in the core network node to which the UE is accessed initially, the core network node lacks in an index associated to the context of the UE.

To make the objectives, technical solutions and advantages of the present invention more clear, the present invention will be further described in detail with reference to the accompanying drawings by embodiments. "Dedicated core network" herein may refer to a core network dedicated to serve one or more user types/UE types, or a core network designed for only providing one or more service types. As an example, the user type may be a machine type communication (MTC) user; the UE type may be an MTC UE; and the service type may be an MTC service. A dedicated core network includes one or more core network nodes.

FIG. 2 is a schematic flowchart of a network selection method according to the present invention. This method explains how a base station obtains history cell information of UE. This method includes the following steps.

S201: A first base station acquires core network type information of a core network node from UE, a second base station or a first core network node.

Optionally, the first base station may obtain, according to the core network type information of the core network node, information about whether a core network to which this core network node belongs is a dedicated core network and information about a dedicated core network to which this core network node belongs, for example, the UE type or service type supported by this core network node.

Optionally, the core network type information at least contains but is not limited to one of the following contents: an indicator of a dedicated core network, an identifier of a dedicated core network, a supported UE type (for example, UE usage type), a supported user type, a supported service type, a dedicated core network type, an identifier of a core network node, a group identifier of a core network node, and an identifier of a Public Land Mobile Network (PLMN). The UE type, the user type or the service type of a UE may be subscription data of the UE. The dedicated core network type may be a default dedicated core network or a non-dedicated core network.

Optionally, the core network node is an MME or an SGSN, and an identifier of the core network node includes but is not limited to a Globally Unique Mobility Management Entity Identifier (GUMMEI), a Mobility Management Entity Code (MMEC), a Serving GPRS Support Node (SGSN) identifier. The group identifier of the core network node includes but is not limited to an MME Group Identifier (MMEGI) and an SGSN pool identifier (for example, Null NRI, a group of NRI values).

In some embodiments, the core network type information of a core network node, acquired from the UE, is core network type information of a last core network node attached by the UE.

In some embodiments, the core network type information of a core network node, acquired from the second base station, is core network type information of a core network node to which the second base station and/or a neighboring base station is connected.

In some embodiments, the core network type information of a core network node, acquired from the first core network node, is core network type information of the first core network node.

In some embodiments, when types of core networks to which core network nodes belong are the same, it is indicated that the core network nodes are non-dedicated core networks, the core network nodes are dedicated core networks, the dedicated core network identifiers of the core network nodes are the same, the UE types supported by the core network nodes or the service types supported by the core network nodes are the same; and when types of core networks to which core network nodes belong are different, the UE types or the service types supported by the core network nodes may be different.

The core network node may be an MME or an SGSN. The first base station and the second base station may be an eNB or an RNC.

S202: The first base station selects a core network node for the UE according to the acquired core network type information and information about a second core network node provided by the UE.

Optionally, information about a second core network node provided by the UE is information about a last core network node attached by the UE. When the UE initiates connection establishment, the UE provides an identifier (for example, GUMMEI) of a last core network node attached by the UE, and the first base station may select a core network node having a same core network type information as a last core network node attached by the UE, according to core network type information of the last core network node attached by the UE and core network type information of a core network node to which the first base station is connected.

Optionally, the first base station may obtain the core network type information of the second core network node sent by the UE when the UE establishes connection, or the core network type information of the second core network node in S201. If the core network type information acquired by the first base station in S201 contains an identifier or a group identifier of the second core network node, the first base station may connectedly obtain the core network type information of the second core network node. The core network type information is as described in S201, and will not be repeated here.

Optionally, the first base station may obtain, from S201, core network type information of a core network node to which the first base station is connected.

Optionally, the first base station may obtain, from S201, core network type information of a core network node to which a neighboring base station is connected.

Optionally, in the following conditions, the first base station selects, for UE, a core network node in a non-dedicated core network or default dedicated core network or randomly selects a core network node, and the non-dedicated core network or default dedicated core network may be a core network supporting all function sets and supporting all UE types, user types or service types:

condition 1: the second core network node does not belong to any dedicated core network;

condition 2: the core network type information of the core network node to which the first base station is connected, is different from the core network type information of the second core network node;

condition 3: the core network type information acquired by the first base station in S201 does not contain the core network type information of the second core network node; and condition 4: PLMN selected by the UE is different from the last PLMN registered by the UE, i.e. different from the PLMN in the identifier of the last core network node attached by the UE.

Optionally, the first base station may obtain, according to core network type information of a core network node in S201, information about whether a core network to which a core network node belongs is a dedicated core network and information about a dedicated core network to which the core network node belongs, for example, the UE type or service type supported by the core network node.

First Embodiment

FIG. 3 is a schematic view of a first embodiment of the network selection method according to the present invention. This method includes the following steps.

S301: The first base station sends an S1 Setup Request message to a core network node.

S302: The core network node sends an S1 Setup Response message to the first base station. Optionally, the S1 Setup Response message contains core network type information of the core network node. The core network type information is as described in S201, and will not be repeated here.

Second Embodiment

FIG. 4 is a schematic view of a second embodiment of the network selection method according to the present invention. This method includes the following steps.

S401: A first base station receives an X2 Setup Request from a second base station. Optionally, the X2 Setup Request message indicates core network type information of a core network node to which the second base station is connected. The core network type information is as described in S201, and will not be repeated here.

S402: The first base station sends an X2 Setup Response to the second base station. Optionally, the X2 Setup Response message indicates core network type information of a core network node to which the first base station is connected. The core network type information is as described in S201, and will not be repeated here.

Third Embodiment

FIG. 5 is a schematic view of a third embodiment of the network selection method according to the present invention. This method includes the following steps.

S501: A first base station receives an eNB configuration update request message from a second base station. Optionally, the eNB configuration update request message indicates core network type information of a core network node to which the second base station is connected. The core network type information is as described in S201, and will not be repeated here.

Fourth Embodiment

FIG. 6 is a schematic view of a fourth embodiment of the network selection method according to the present invention. This method includes the following steps.

S601: A first base station sends an eNB configuration transfer message or direct information transfer message to a core network node. Optionally, the message contains core network type information of a core network node to which the first base station is connected. The core network type information is as described in S201, and will not be repeated here.

S602: The core network node sends an MME configuration transfer message or direct information transfer message to a second base station. Optionally, the message contains core network type information of a core network node to which the first base station is connected. The core network type information is as described in S201, and will not be repeated here.

Fifth Embodiment

FIG. 7 is a schematic view of a fifth embodiment of the network selection method according to the present invention. This method includes the following steps.

S701: A first base station sends an eNB direct information transfer message or direct information transfer message to a first core network node. Optionally, the message contains core network type information of a core network node to which the first base station is connected. The core network type information is as described in S201, and will not be repeated here.

S702: The first core network node sends an RAN Information Management (RIM) message to a second core network node. Optionally, the message contains core network type information of a core network node to which the first base station is connected. The core network type information is as described in S201, and will not be repeated here.

S703: The second core network node sends a direct information transfer message or an MME direct information transfer message to a second base station. Optionally, the message contains core network type information of a core network node to which the first base station is connected. The core network type information is as described in S201, and will not be repeated here.

Sixth Embodiment

FIG. 8 is a schematic view of a sixth embodiment of the network selection method according to the present invention. This method includes the following steps.

S801: UE establishes RRC connection with a first base station. UE indicates an identifier of a first MME and a selected PLMN in an RRC establishment completion message. The identifier of the first MME is an identifier GUMMEI of an MME on which the UE has been registered, and the GUMMEI contains an MME group identifier (MMEGI).

S802: The first base station finds that the first MME is not the MME to which the first base station is connected, and in this case, it is needed to select the MME to which the first base station is connected for the UE. The first base station may obtain, according to the acquired core network type information in S201, core network type information of the first MME or of an MME group to which the first MME belongs (the core network type information of the MME group to which the first MME belongs is also the core network type information of the first MME), and selects a second MME for the UE, the core network type information of the second MME being the same as the core network type information of the first MME. The second MME is one of MMEs to which the first base station is connected.

Optionally, in the following conditions, the first base station may select, for the UE, a second MME in a non-dedicated core network or default dedicated core network or randomly selects a second MME: condition 1: the first MME does not belong to any dedicated core network; condition 2: the core network type information of the MME to which the first base station is connected, is different from the core network type information of the first MME; condition 3: the core network type information acquired by the first base station in S201 does not contain the core network type information of the first MME; and condition 4: PLMN selected by UE is different from PLMN on which the UE is registered finally, i.e., different from the PLMN in the identifier of the last core network node attached by the UE.

Said core network type information is as described in S201, and will not be described here.

Now, the first base station sends an initial UE message to the second MME.

FIG. 10 is a schematic flowchart of a second network selection method according to the present invention. This method includes the followings steps.

S1001: A first access network node (for example, a home base station, a relay node or a base station) receives core network redirection information.

Optionally, the core network redirection information may be sent by a second access network node (for example, a home base station gateway or a base station) or a first core network node.

Optionally, the core network redirection information includes but is not limited to core network node group identifier, information about a core network node to which the UE has accessed, a Non-Access Stratum Protocol Data Unit (NAS PDU), all contents in a first initial UE message, and at least one information element (IE) contained in a first initial UE message.

Optionally, the information about a core network node to which the UE has accessed may be one or more of the following: an identifier of a core network node to which UE has accessed (for example, an identifier of an MME: GUMMEI, MMEC, MMEGI and MMEC), or a temporary identifier allocated to the UE by a core network node to which the UE has accessed (for example, Globally Unique Temporary Identifier (GUTI), additional GUTI).

Optionally, the core network redirection information is contained in a redirection NAS request message (for example, Reroute NAS Request).

S1002: The first access network node (for example, a home base station, a relay node or a base station) sends core network redirection information to the second access network node.

Optionally, the core network redirection information is contained in a second initial UE message (for example, Initial UE Message). The first access network node may perform one or more operations of the following to contain information about a core network node to which UE has accessed.

The first access network node contains, an identifier (for example, GUMMEI, MMEC) of a core network node to which UE has accessed, in the second initial UE message. This may be realized by adding a new information element or replacing the core network node identifier in the second initial UE message.

The first access network node contains a temporary identifier (for example, GUTI, additional GUTI) allocated to the UE by a core network node to which the UE has accessed in the second initial UE message.

The first access network node contains, a core network node identifier (for example, GUMMEI, MMEC, MMEGI and MMEC) in a temporary identifier allocated to the UE by a core network node to which the UE has accessed, in the second initial UE message. This may be realized by adding a new information element (for example, a second GUMMEI, MMEC) or replacing the core network node identifier (for example, GUMMEI) in the second initial UE message.

The first access network node sets GUMMEI type as native or sets a new type (for example, redirection type), the new type indicating that a core network node identifier in the second initial UE message is a core network node identifier in the core network redirection information. In some implementations, the GUMMEI type, as a native identifier, is a native identifier of a core network node (for example, identifier GUMMEI of the MME) other than a mapped core network node identifier (for example, the identifier GUMMEI of the MME is obtained by mapping based on packet temporary subscriber identities (P-TMSI)/routing area identification (RAI)).

S1003: The second access network node selects a second core network node for the UE according to the received redirection information. Optionally, the second access network node selects a second core network node according to a service operator identifier of the UE (for example, a PLMN identifier) and/or a core network node group identifier (for example, MMEGI) indicated by the core network redirection information. In some implementations, if, among second core network nodes satisfying the conditions, there is a core network node supports the information of the core network node to which the UE used to access, this core network node is preferably selected by the second access network node to serve the UE.

FIG. 11 is a schematic flowchart of a third network selection method according to the present invention. This method includes the following steps.

S1101: A second access network node (for example, a base station or a home base station gateway node) receives core network redirection information.

Optionally, the core network redirection information may be sent by a first core network node or a first access network node.

The core network redirection information is as described in S1001, and will not be described here.

Optionally, the core network redirection information is contained in a redirection NAS request message (for example, Reroute NAS Request).

S1102: The second access network node terminates the redirection NAS request message, selects a second core network node for the UE according to the core network redirection information directly, and generates and sends a second initial UE message to the second core network node.

Optionally, the second access network node may generate the second initial UE message according to all contents in a previously saved first initial UE message or an initial UE message in the received redirection information.

FIG. 12 is a schematic flowchart of a fourth network selection method according to the present invention. This method includes the following steps.

S1201 is the same as S1101, and will not be described here.

Step 1202: The second access network node terminates the redirection NAS request message, directly selects a second core network node for the UE according to the core network redirection information, and processes in one of the following two conditions.

Condition 1: The second access network node may generate and resend a second initial UE message to a first core network node, if the second core network node is not adaptable for the access of the UE, for example, when all possible second core network nodes are overloaded and the connection establishment reason of the UE does not allow for access.

Optionally, the second initial UE message contains an identifier (for example, MME UE S1AP ID) allocated to the UE by the first core network node so that the first core network indexes context of the UE.

Condition 2: The second access network node has sent a UE access request to the second core network node, and the second access network node may request the first core network node to release the context of the UE.

Corresponding to this method, the present application further discloses a base station, the preferred composition structure of which is as shown in FIG. 9. This device includes an information acquisition module and a network selection module, wherein:

said information acquisition module is configured to acquire core network type information of a core network node from UE, a second base station or a first core network node; and said network selection module is configured to select a core network node for the UE, according to the acquired core network type information and information about a second core network node provided by the UE.

Corresponding to the second method as described above, the present application further discloses a network selection device, the preferred composition structure of which is as shown in FIG. 13. This device includes an information receiving module and an information sending module, wherein:

said information receiving module is configured to receive core network redirection information; and said information sending module is configured to send the core network redirection information to a second access network node, wherein said core network redirection information is used by the second access network node to select a second core network node for the UE.

Corresponding to the third method as described above, the present application further discloses a network selection device, the preferred composition structure of which is as shown in FIG. 14. This device includes an information receiving module and a first processing module, wherein:

said first information receiving module is configured to receive core network redirection information; and said first processing module is configured to terminate a redirection NAS request message, select a second core network node for UE according to the core network redirection information, and generate and send a second initial UE message to the second core network node.

Corresponding to the fourth method as described above, the present application further discloses a network selection device, the preferred composition structure of which is as shown in FIG. 15. This device includes a second information receiving module and a second processing module, wherein:

said second information receiving module is configured to receive core network redirection information; and said second processing module is configured to terminate a redirection NAS request message, select a second core network node for UE according to the core network redirection information, and process in one of the following two conditions:

condition 1: the second access network node generates and resends a second initial UE message to a first core network node if the second core network node is not adaptable for the access of the UE, said second initial UE message containing an identifier allocated to the UE by the first core network node and used by a first core network to index context of the UE; and condition 2: the second access network node requests the first core network node to release the context of the UE.

It may be seen from the above technical solutions that, a base station may determine core network type information of a core network node on which UE is registered finally, by acquiring the core network type information of the core network node, and thus select accurately a proper new core network node for the UE, so that the re-routing between core network nodes is reduced, the access delay of UE is shortened, and the communication demand of UE types or service types which have requirements on delay is satisfied.

The foregoing descriptions are merely preferred embodiments of the present invention and not intended to limit the present invention. All modifications, equivalent replacements, improvements or the like made without departing from the spirit and principle of the present invention shall be regarded as falling into the protection scope of the present invention.

The invention claimed is:

1. A method by a base station in a wireless communication system, the method comprising:
receiving, from at least one network node, a first message including first information on a dedicated core network (DCN) served by the at least one network node;
receiving, from a terminal, a second message including second information on an identity (ID) of a DCN;
determining a network node of the at least one network node for the terminal based on the first information and the second information; and
transmitting, to the network node, an initial message of the terminal.

2. The method of claim 1, wherein a completion of a radio resource control (RRC) connection establishment is confirmed based on the second message, and
wherein the first message is received in a response message of an S1 setup procedure.

3. The method of claim 1, wherein the second message further includes third information on a serving network node of the terminal, and
wherein the network node is determined based on the first information and the second information, in case that the serving network node identified based on the third information is not connected with the base station.

4. The method of claim 1, wherein the network node is selected among a plurality of network nodes connected to the base station, the plurality of network nodes including the at least one network node.

5. A base station in a wireless communication system, the base station comprising:
a transceiver; and
a controller coupled with the transceiver and configured to:
receive, from at least one network node, a first message including first information on a dedicated core network (DCN) served by the at least one network node,
receive, from a terminal, a second message including second information on an identity (ID) of a DCN,
determine a network node of the at least one network node for the terminal based on the first information and the second information, and
transmit, to the network node, an initial message of the terminal.

6. The base station of claim 5, wherein a completion of a radio resource control (RRC) connection establishment is confirmed based on the second message, and
wherein the first message is received in a response message of an S1 setup procedure.

7. The base station of claim 5, wherein the second message further includes third information on a serving network node of the terminal, and
wherein the network node is determined based on the first information and the second information in case that the serving network node identified based on the third information is not connected with the base station.

8. The base station of claim 5, wherein the network node is selected among a plurality of network nodes connected to the base station, the plurality of network nodes including the at least one network node.

9. A method by a network node in a wireless communication system, the method comprising:
receiving, from a base station, a first message to request a setup of an interface between the base station and the network node;
transmitting, to the base station, a second message in response to the first message, the second message including first information on a dedicated core network (DCN) served by the network node; and
receiving, from the base station, an initial message of a terminal,
wherein the initial message is received, from the base station, in case that the network node from at least one network node is selected by the base station based on the first information and second information on an identity (ID) of a DCN, and
wherein the second information is transmitted from the terminal to the base station.

10. The method of claim 9, wherein the first message is an S1 setup request message, and
wherein the second message is an S1 setup response message.

11. The method of claim 9, wherein the second information is transmitted from the terminal to the base station in a third message confirming a completion of a radio resource control (RRC) connection establishment.

12. The method of claim 11, wherein the third message further includes third information on a serving network node of the terminal, and
wherein the network node is selected based on the first information and the second information, in case that the serving network node identified based on the third information is not connected with the base station.

13. The method of claim 9, wherein the network node is selected among a plurality of network nodes connected to the base station, the plurality of network nodes including the at least one network node.

14. A network node in a wireless communication system, the network node comprising:
a transceiver; and
a controller coupled with the transceiver and configured to:
receive, from a base station, a first message to request a setup of an interface between the base station and the network node,
transmit, to the base station, a second message in response to the first message, the second message including first information on a dedicated core network (DCN) served by the network node, and
receive, from the base station, an initial message of a terminal,
wherein the initial message is received from the base station, in case that the network node is selected from at least one network node by the base station based on the first information and second information on an identity (ID) of a DCN, and
wherein the second information is transmitted from the terminal to the base station.

15. The network node of claim 14, wherein the first message is an S1 setup request message, and
wherein the second message is an S1 setup response message.

16. The network node of claim 14, wherein the second information is transmitted from the terminal to the base station in a third message confirming a completion of a radio resource control (RRC) connection establishment.

17. The network node of claim 16, wherein the third message further includes third information on a serving network node of the terminal, and
wherein the network node is selected based on the first information and the second information, in case that the serving network node identified based on the third information is not connected with the base station.

18. The network node of claim 14, wherein the network node is selected among a plurality of network nodes connected to the base station, the plurality of network nodes including the at least one network node.

* * * * *